(12) United States Patent
Tsai et al.

(10) Patent No.: US 8,280,227 B2
(45) Date of Patent: Oct. 2, 2012

(54) CAPTION REMOVAL METHOD FOR DIGITAL VIDEO EDITING SYSTEM

(75) Inventors: Tsung-Han Tsai, Taoyuan County (TW); Chih-Lun Fang, Yilan County (TW)

(73) Assignee: National Central University, Taoyuan County (TW)

( * ) Notice: Subject to any disclaimer, the term of this patent is extended or adjusted under 35 U.S.C. 154(b) by 366 days.

(21) Appl. No.: 12/687,882

(22) Filed: Jan. 15, 2010

(65) Prior Publication Data

US 2010/0260467 A1    Oct. 14, 2010

(30) Foreign Application Priority Data

Apr. 10, 2009    (TW) ................................ 98112057 A

(51) Int. Cl.
*H04N 5/93*    (2006.01)
(52) U.S. Cl. ....................................................... 386/278
(58) Field of Classification Search ........................ None
See application file for complete search history.

(56) References Cited

U.S. PATENT DOCUMENTS 6,185,329 B1 *    2/2001    Zhang et al. .................. 382/176

OTHER PUBLICATIONS

Space-Time Completion of Video (IEEE Transactions on Pattern Analysis and Machine Intelligence, vol. 29, Issue 3, Mar. 2007).
Video Inpainting Under Constrained Camera Motion (IEEE Transactions on Image Processing, vol. 16, No. 2, Feb. 2007).
Image Completion with Structure Propagation (ACM Conf. Comp. Graphics (SIGGRAPH), vol. 24, 2005).

* cited by examiner

*Primary Examiner* — Huy T Nguyen
(74) *Attorney, Agent, or Firm* — CKC & Partners Co., Ltd.

(57) ABSTRACT

A caption removal method for a digital video editing system includes the following steps. A video frame of a video sequence is inputted. A high level executing stage is provided. The high level executing stage includes the step of recovering the structural region of the temporal domain in the video frame and the step of recovering the structural region of the spatial domain in the video frame. A low level executing stage is provided. The low level executing stage includes the step of recovering the non-structural region in the video frame.

17 Claims, 12 Drawing Sheets

CAPTION REMOVAL METHOD FOR DIGITAL VIDEO EDITING SYSTEM

RELATED APPLICATIONS

This application claims priority to Taiwan Application Serial Number 98112057, filed Apr. 10, 2009, which is herein incorporated by reference.

BACKGROUND

1. Field of Invention

The present invention relates to a caption removal method. More particularly, the present invention relates to a caption removal method for a digital video editing system.

2. Description of Related Art

Films nowadays can be spread rapidly through a variety of media, but some unwanted objects, such as strangers, advertising subtitles, etc, are often presented in films. One kind of unwanted objects seen more often is the captions embedded in films, and these captions often are unwanted ads. To be able to remove these objects, technologies regarding object removal have been proposed in recent years. For example, Y. Wexler et al. proposed the 5-Dimension block search in "Space-time video completion" (IEEE Trans. Pattern Analysis and Machine Intelligence, vol. 29, Issue 3, March 2007), and K. A. Patwardhan et al. proposed an object-background inpainting technology in "Video inpainting under constrained camera motion" (IEEE Trans. Image Processing, vol. 16, Issue 2, February 2007). However, technologies as such are only applicable to object removals with many known pixels around. For example, these technologies are applicable to remove regular movements such as walking movements and objects covering small areas in films. However, these technologies cannot effectively remove objects in films covering a wide range and lacking surrounding information such as moving captions.

Although J. Sun et al. proposed a recovering method for structural regions in "Image completion with structure propagation" (ACM Conf. Comp. Graphics (SIGGRAPH), vol. 24, 2005), this method requires manual completion of structural drawing, and thus automatic structure recovery of the structural region cannot be achieved.

Furthermore, removal techniques for known objects involve high computation, and thus do not meet the requirements for real-time processing. Besides, it is difficult to maintain the consistency of temporal domain and spatial domain. Therefore, a new caption removal method is provided.

SUMMARY

The objective of the present invention is to provide a caption removal method for a digital video editing system. The present invention provides automatic analysis and recovery of film content and can process caption removals for large and complex areas.

According to one embodiment of the present invention, a caption removal method for a digital video editing system includes the following steps:

(1) Input a video frame of a video sequence.
(2) Provide a high level executing stage, the high level executing stage comprising the following steps:
  (2.1) Recover the structural region of the temporal domain in the video frame.
  (2.2) Recover the structural region of the spatial domain in the video frame.
(3) Provide a low level executing stage, the low level executing stage comprising the following step:
  (3.1) Recover the non-structural region in the video frame.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1A:
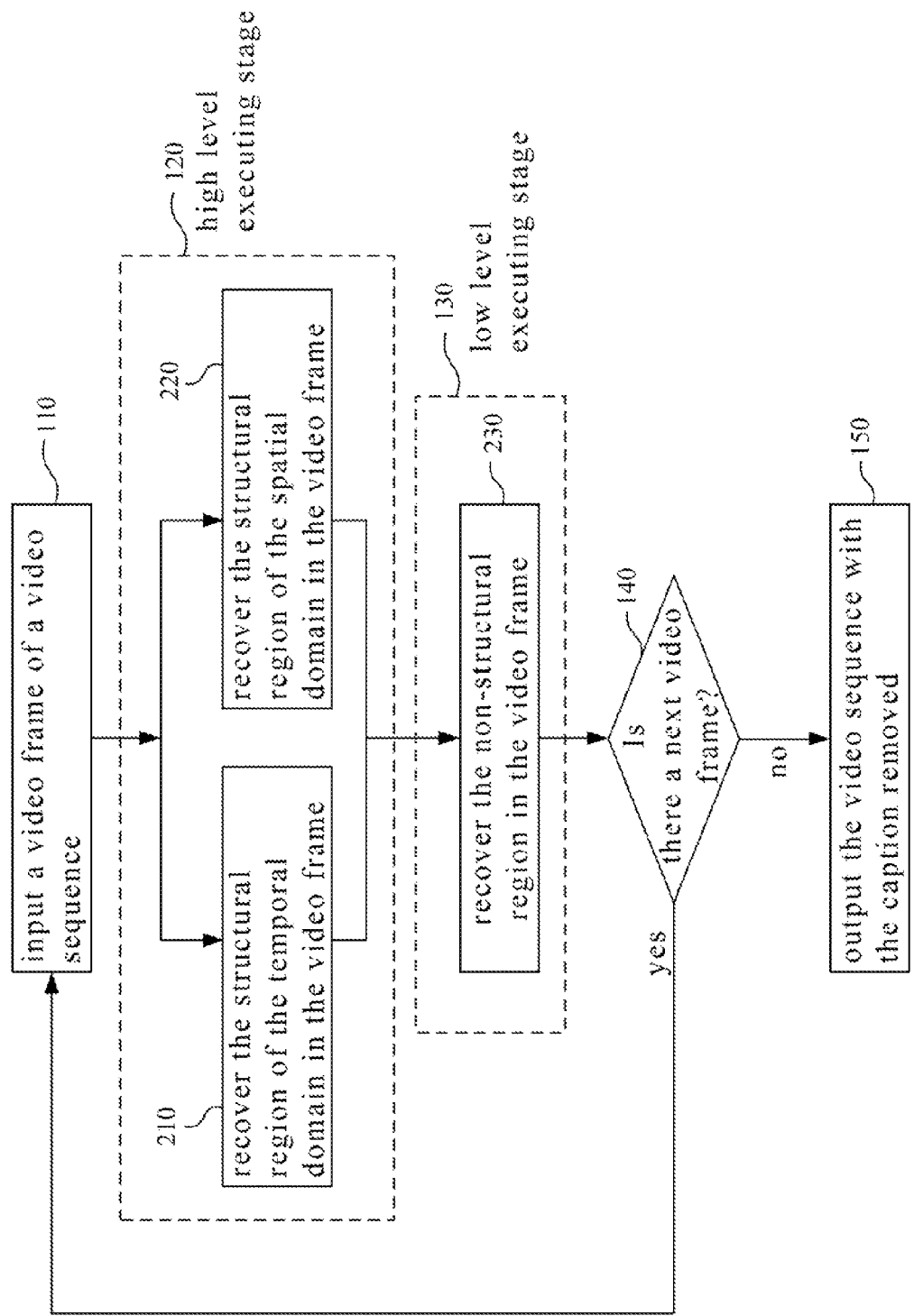
FIG. 1A is a flow chart illustrating a caption removal method according to one embodiment of this invention.

Reference will now be made in detail to the embodiments of this invention, examples of which are illustrated in the accompanying drawings. Wherever possible, the same reference numbers are used in the drawings and the description to refer to the same or like parts.

FIG. 1A is a flow chart illustrating a caption removal method according to one embodiment of this invention. This method is applicable to the removal of caption in a digital video editing system, and uses the information of the temporal and structural domain to perform the removal. The caption removal method includes the following steps. (It should be understood that the order of steps presented in this embodiment might be adjusted according to the actual practices. The steps or part of the steps may be performed at the same time.)

(1) Input a video frame of a video sequence (step 110). A video sequence in this embodiment is a processed video sequence with a shot. A video sequence may include a series of video frames.

(2) Provide a high level executing stage (step 120). First, a Canny edge detector may be used to divide the video sequence into two areas based on a hierarchical model. Then, a recovery process may be performed for each area. A Canny edge detector may detect object edges, which may be regarded as structures of an object. The high level executing stage includes the following steps:
(2.1) Recover the structural region of the temporal domain in the video frame (step 210).
(2.2) Recover the structural region of the spatial domain in the video frame (step 220).
Steps 210 and 220 may be performed simultaneously.
(3) Provide a low level executing stage (step 130). The low level executing stage includes the step of recovering the non-structural region in the video frame (step 230).
(4) Determine whether there is a next video frame (step 140). When it is determined there is a next video frame, return to step 110 and input another video frame. When it is determined there is not, meaning that the current video frame is the last one in the sequence, output the video sequence with the caption removed (step 150).

Figure 1B:
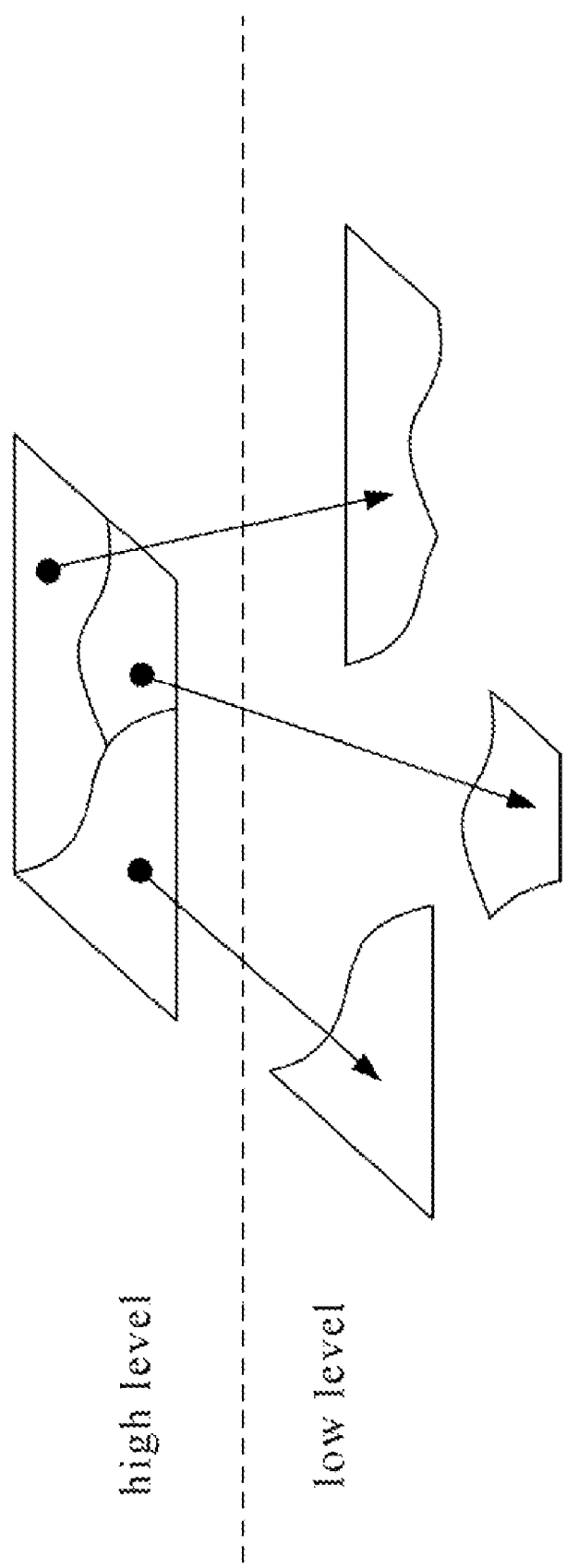
FIG. 1B is a diagram illustrating a hierarchical model according to one embodiment of this invention.

FIG. 1B is a diagram illustrating a hierarchical model according to one embodiment of this invention. This embodiment may achieve automatic caption removal by using the concept of a hierarchical model. The structural region of the temporal domain and the structural region of the spatial domain are recovered in the high level executing stage. The non-structural region (i.e. texture region) is recovered in the low level executing stage. Temporal and spatial consistency may be achieved for complex and structural videos.

Figure 2A:
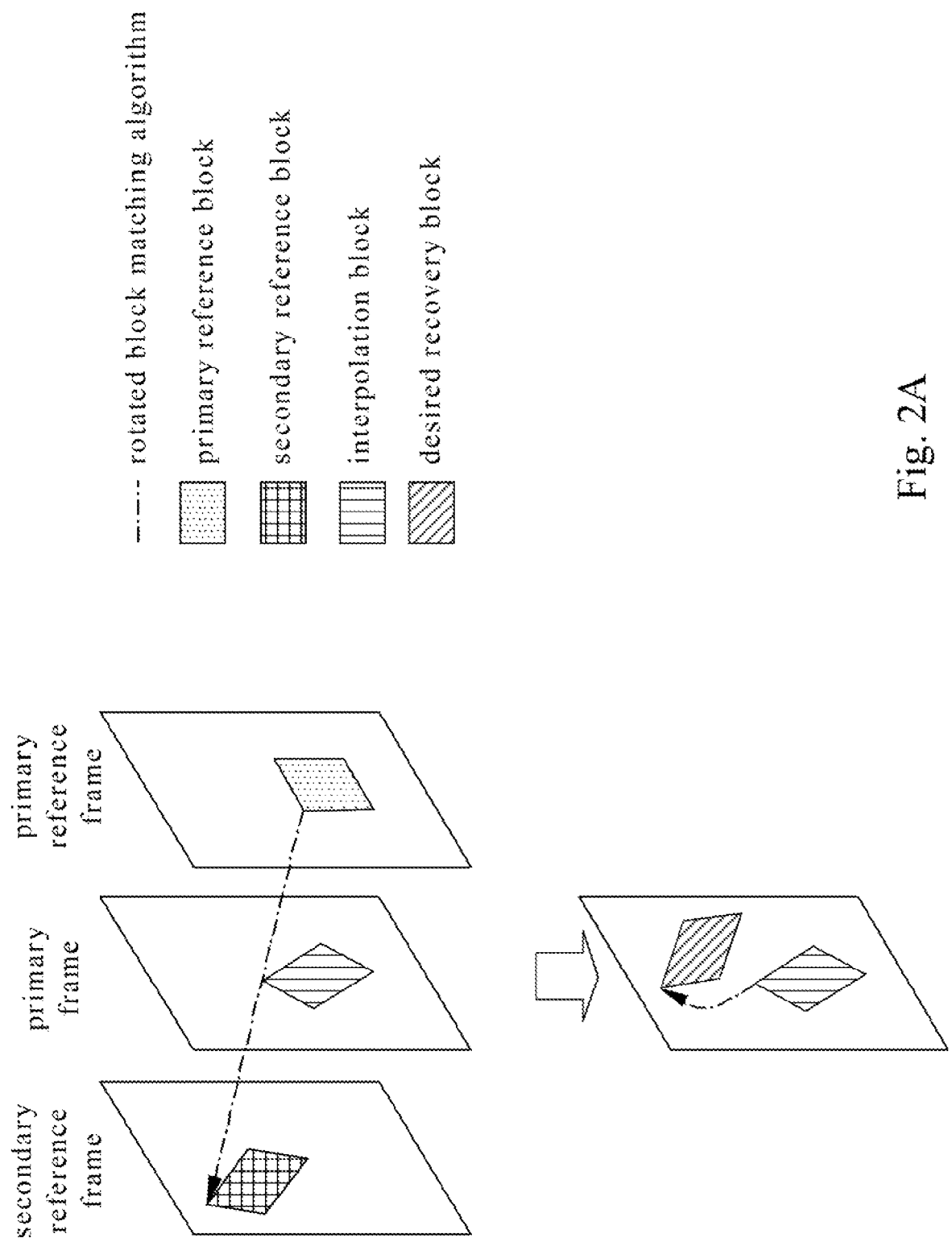
FIG. 2A is a diagram illustrating the structural region of the temporal domain in a high level executing stage.
Figure 2B:
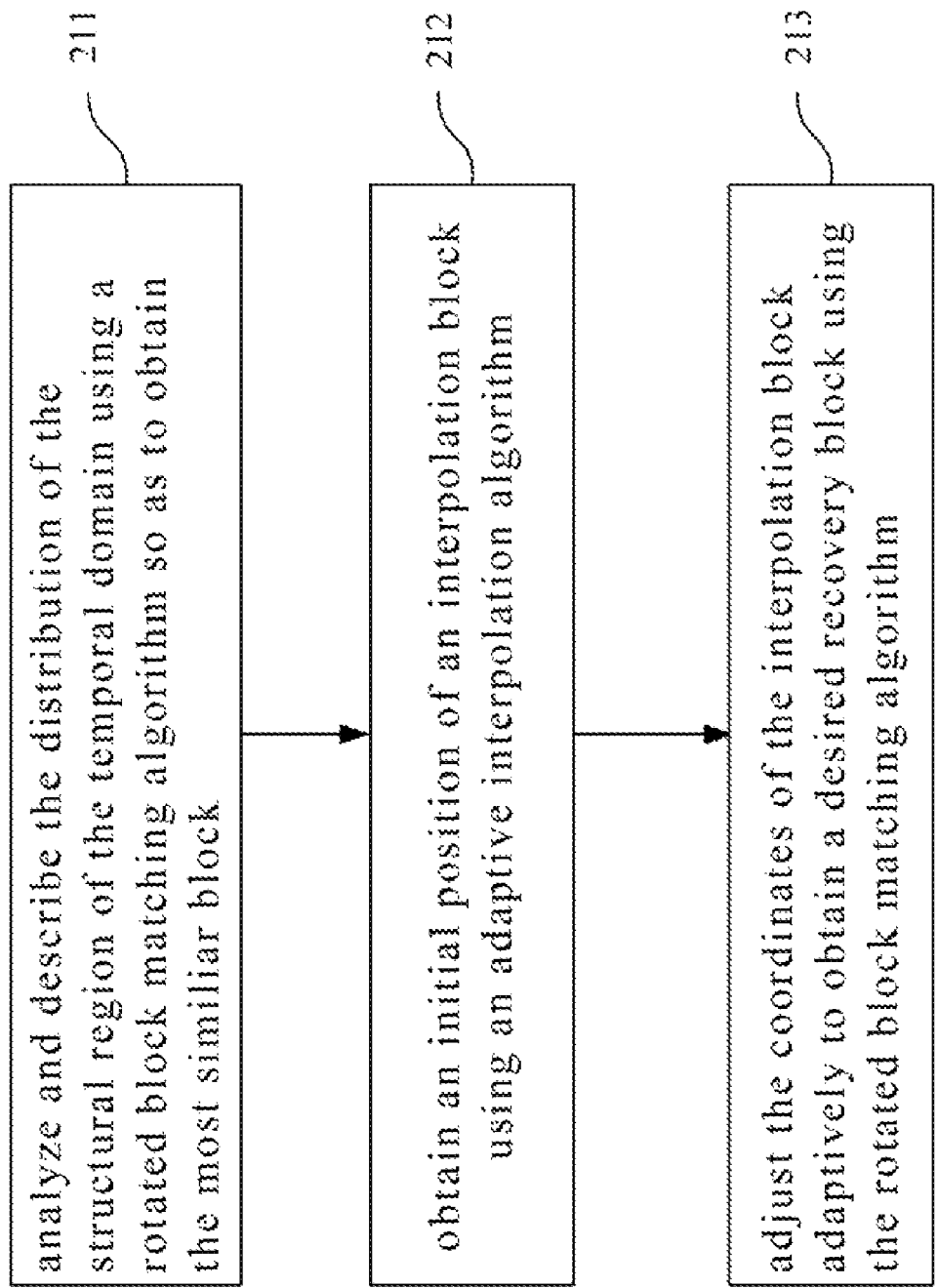
FIG. 2B is a flow chart illustrating detailed steps included in step 210 recovering the structural region of the temporal domain in the video frame shown in FIG. 1A.

FIG. 2A is a diagram illustrating the structural region of the temporal domain in a high level executing stage. FIG. 2B is a flow chart illustrating detailed steps included in step 210 recovering the structural region of the temporal domain in the video frame shown in FIG. 1A:

(2.1.1) Analyze and describe the distribution of the structural region of the temporal domain to obtain a most similar block using a rotated block matching algorithm (step 211).
(2.1.2) Obtain an initial position of an interpolation block using an adaptive interpolation algorithm (step 212).
(2.1.3) Adjust the coordinates of the interpolation block adaptively to obtain a desired recovery block using the rotated block matching algorithm (step 213). In the same frame, sequentially search all blocks within 40×40 pixel units around the interpolation block to obtain a displacement value, so the removed unknown pixels in the desired recovery block in the primary frame are recovered.

Figure 3A:
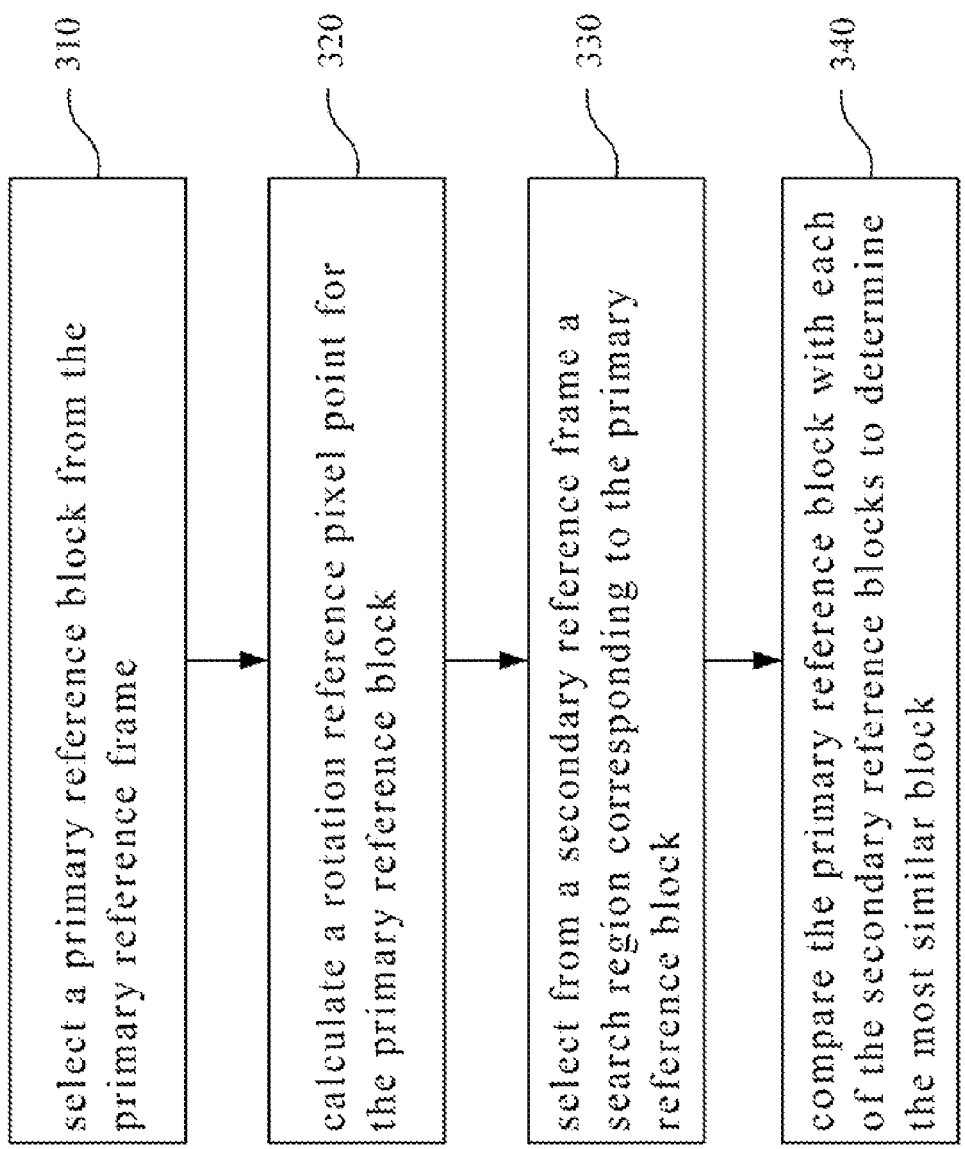
FIG. 3A is a flow chart illustrating detailed steps included in the rotated block matching algorithm.

FIG. 3A is a flow chart illustrating detailed steps included in the rotated block matching algorithm. The rotated block matching algorithm may effectively process the kind of change such as a shoulder turn in a frame. Step 211 analyzing and describing the distribution of the structural region of the temporal domain to obtain a most similar block using a rotated block matching algorithm is used here for the illustration purpose. When the rotated block matching algorithm is used in other steps, the detailed steps may be adjusted to implement similar concepts according to actual situations.

(2.1.1.1) Select a primary reference block from a primary reference frame (step 310). The primary reference frame may be one of the adjacent frames of the primary frame. For instance, the primary reference frame may be the first to or second frame that comes before or after the primary frame. The primary frame is the currently inputted frame. The primary reference block may include known and unknown pixels. A block most similar to the primary reference block will be found in this embodiment. In one example, the size of the primary reference block is 5×5 pixel units.
(2.1.1.2) Calculate a rotation reference pixel for the primary reference block (step 320). The rotation reference pixel may be obtained by using the following formula:

$$\varphi = \underset{p \in \vartheta}{\mathrm{argmax}}\left(\sqrt{\begin{array}{l}((p_{0,1} - p_{0,0} + p_{1,1} - p_{1,0})/2)^2 + \\ ((p_{0,0} - p_{1,0} + p_{0,1} - p_{1,1})/2^2\end{array}}\right)$$

θ represents all of the pixels in the block, $p_{0,0}$ represents the pixel (p) currently being compared, and $p_{0,1}$, $p_{1,1}$, and $p_{1,0}$ represent the upper, upper right, and right pixels respectively of the pixel (p) currently being compared.

(2.1.1.3) Select from a secondary reference frame a search region corresponding to the primary reference block (step 330). The secondary reference frame may be the first or second frame that comes before or after the primary frame. In one example, the size of the search area corresponding to the primary reference frame is 40×40 pixel units. The search region corresponding to the primary reference block consists of plural secondary reference blocks.
(2.1.1.4) Compare the primary reference block with each of the secondary reference blocks to determine the most similar block (step 340).

Figure 3B:
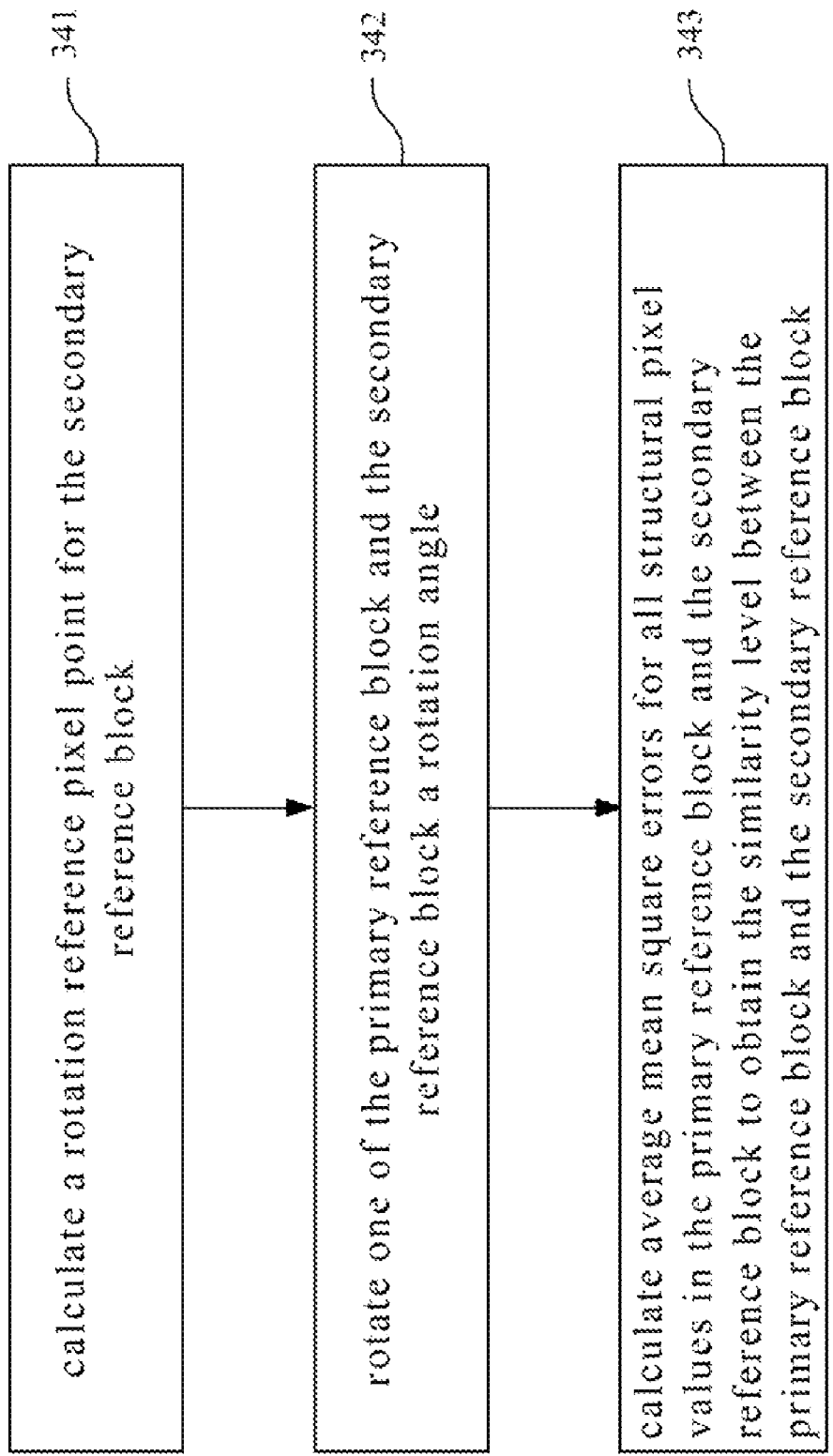
FIG. 3B is a flow chart illustrating detailed steps included in step 340 shown in FIG. 3A.

FIG. 3B is a flow chart illustrating detailed steps included in step 340 the comparing step shown in FIG. 3A. To be more specific, step 340 determines the most similar block from the secondary reference blocks in the search region corresponding to the primary reference block. For each of the secondary reference blocks, the comparing step includes the following steps:

(2.1.1.4.1) Calculate a rotation reference pixel for the secondary reference block (step 341). This may be accomplished by using the formula listed at (2.1.1.2).
(2.1.1.4.2) Rotate one of the primary reference block and the secondary reference block a rotation angle (step 342). The rotation angle is the difference between a perpendicular gradient direction of the rotation reference pixel of the primary reference block and a perpendicular gradient direction of the rotation reference pixel of the secondary reference block. The perpendicular gradient direction is obtained by using the following formula:

$$\Theta_\nabla^\perp = \mathrm{arc.tan}(\phi_{0,1} - \phi_{0,0} + \phi_{1,1} - \phi_{1,0})/(\phi_{0,0} - \phi_{1,0} + \phi_{0,1} - \phi_{1,1}))_\perp$$

$\phi_{0,0}$ represents the rotation reference pixel, and $\phi_{0,1}$, $\phi_{1,1}$, and $\phi_{1,0}$ to represent the upper, upper right, and right pixels respectively of the rotation reference pixel.

(2.1.1.4.3), Calculate average mean square errors for all structural pixel values in the primary reference block and the secondary reference block to obtain the similarity level between the primary reference block and the secondary reference block (step 343).

After all of the average mean square errors for all of the secondary reference blocks and the primary reference block are computed, the secondary reference block with the minimum error is regarded as the most similar block to the primary reference block. Thus, the most similar block is obtained.

Figure 4:
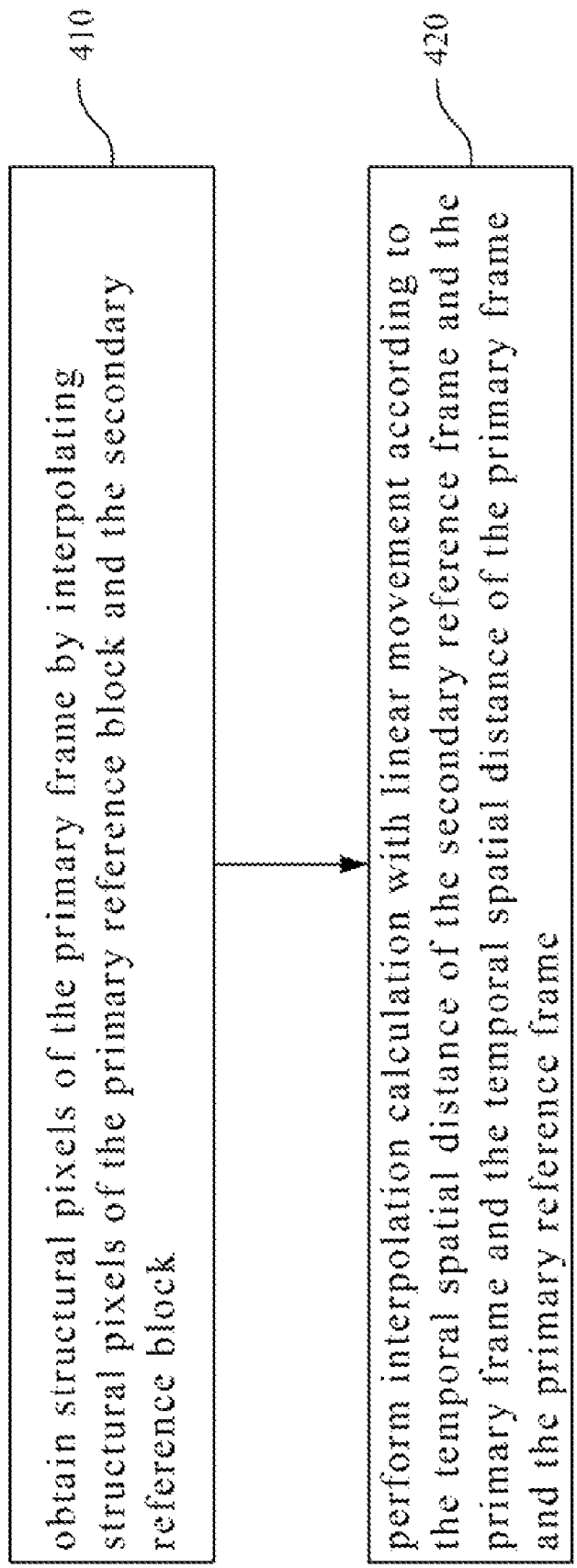
FIG. 4 is a flow chart illustrating detailed steps included in the adaptive interpolation algorithm.

FIG. 4 is a flow chart illustrating detailed steps included in the adaptive interpolation algorithm:

(2.1.2.1) Obtain the structural pixels of the primary frame by interpolating structural pixels of the primary reference block and the secondary reference block (step 410).
(2.1.2.2) Perform the interpolation calculations with linear movement according to the temporal spatial distance between the secondary reference frame and the primary frame and the temporal spatial distance between the primary frame and the primary reference frame (step 420).

Figure 5A:
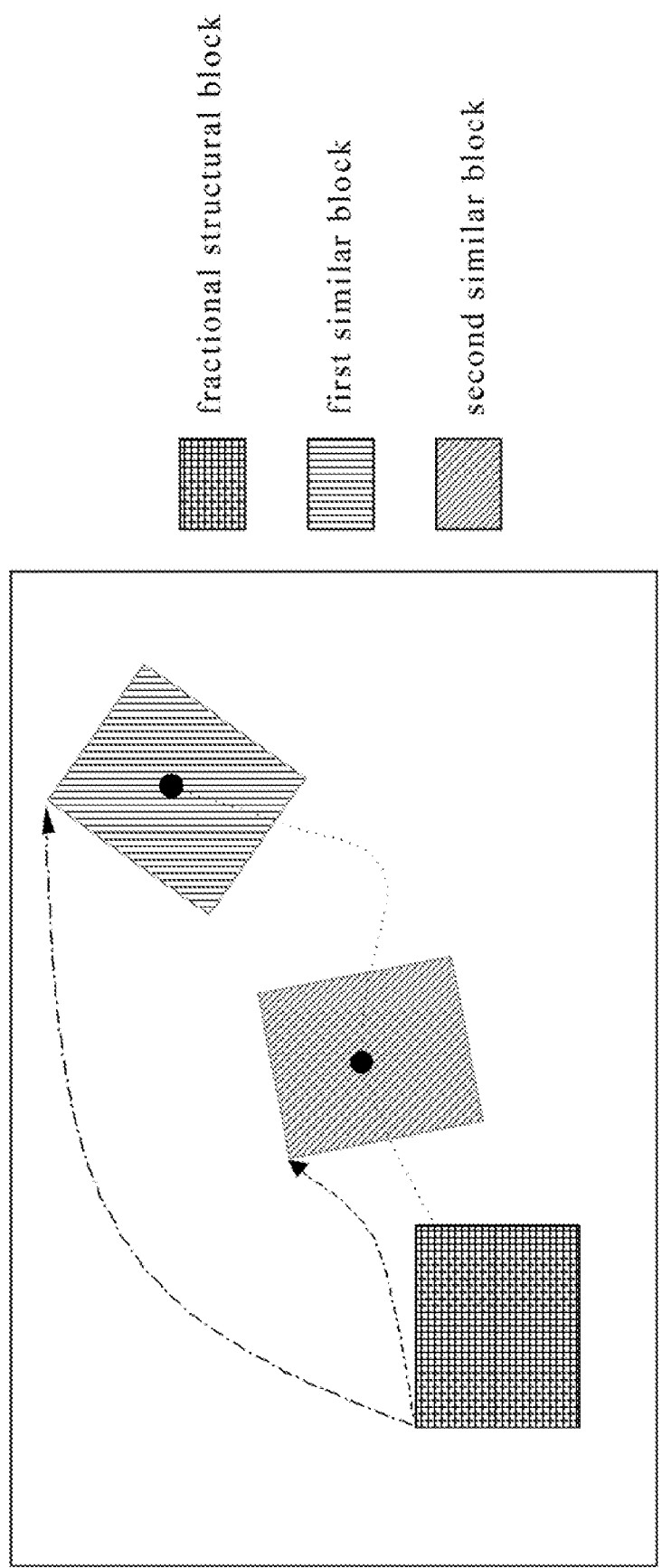
FIG. 5A is a diagram illustrating the structural region of the spatial domain in a high level executing stage.
Figure 5B:
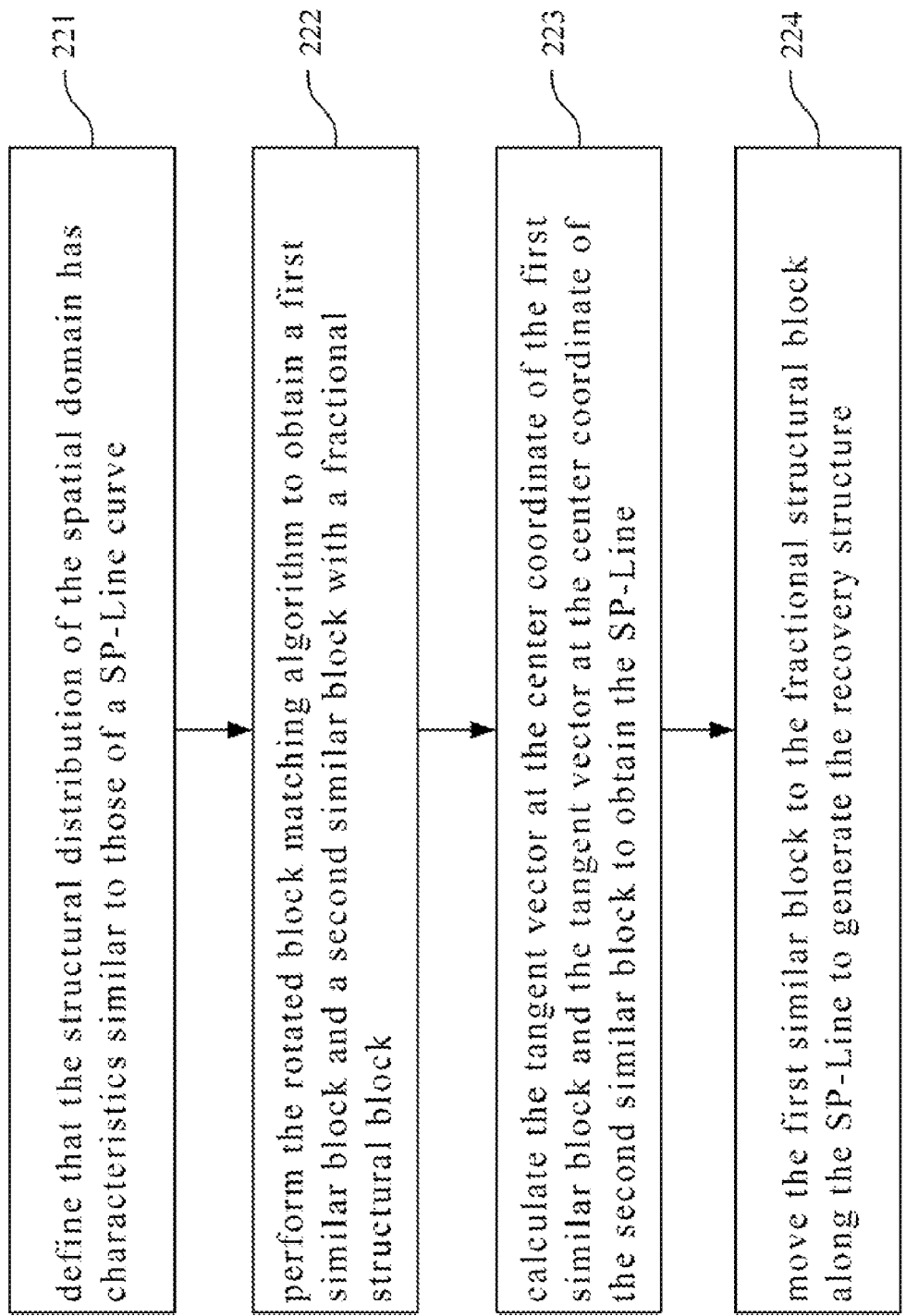
FIG. 5B is a flow chart illustrating detailed steps included in step 220 recovering the structural region of the spatial domain in the video frame shown in FIG. 1A.

FIG. 5A is a diagram illustrating the structural region of the spatial domain in a high level executing stage. FIG. 5B is a flow chart illustrating detailed steps included in step 220 recovering the structural region of the spatial domain in the video frame shown in FIG. 1A:

(2.2.1) Define that the structural distribution of the spatial domain has characteristics similar to those of an SP-Line curve (step 221).

(2.2.2) Perform the rotated block matching algorithm to obtain a first similar block and a second similar block with a fractional structural block (step 222). The first similar block and the second similar block may be obtained by performing the rotated block matching algorithm on the same video frame with the fractional structural block. The SP-Line curve is formed by is connecting the first similar block and the second similar block.

(2.2.3) Calculate the tangent vector at the center coordinate of the first similar block and the tangent vector at the center coordinate of the second similar block to obtain the SP-Line (step 223). The tangent vector is obtained by using the following formula:

$$\Delta \tau_x = \partial V / \partial x, \Delta \tau_y = \partial V / \partial y$$

$$\partial V / \partial y = \sin \theta \cdot dR, \partial V / \partial x = \sin \theta \cdot dR / \tan \theta$$

Figure 5C:
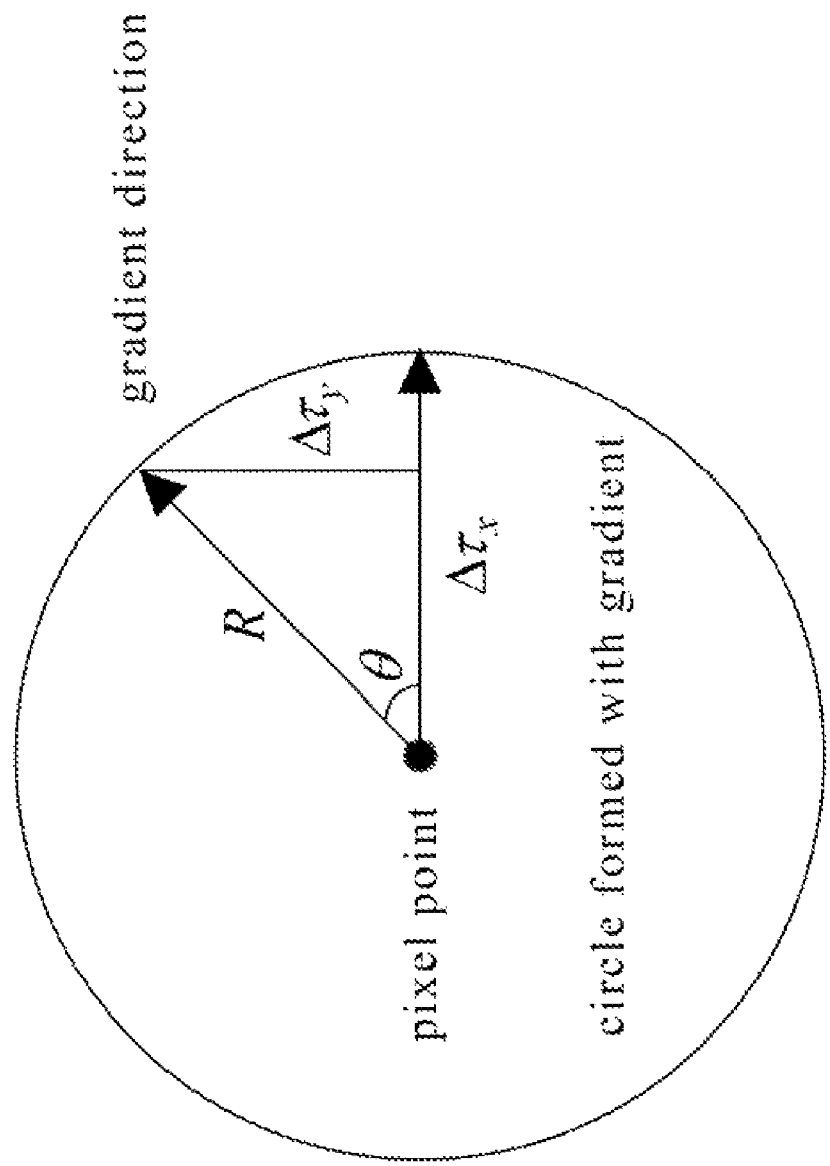
FIG. 5C is a diagram illustrating a tangent vector.

$\Delta \tau_x$ and $\Delta \tau_y$ represent x-axis value and y-axis value of the tangent vector respectively, $\partial V / \partial_y$ and $\partial V / \partial_x$ represent derivatives of the gradient and further represent elements of the tangent vector, $\theta$ represents the gradient angle at the central of a similar block, and R represents radius. Please refer to FIG. 5C. FIG. 5C is a diagram illustrating a tangent vector.

(2.2.4) Move the first similar block to the fractional structural block along the SP-Line to generate the recovering structure (step 224).

Figure 6A:
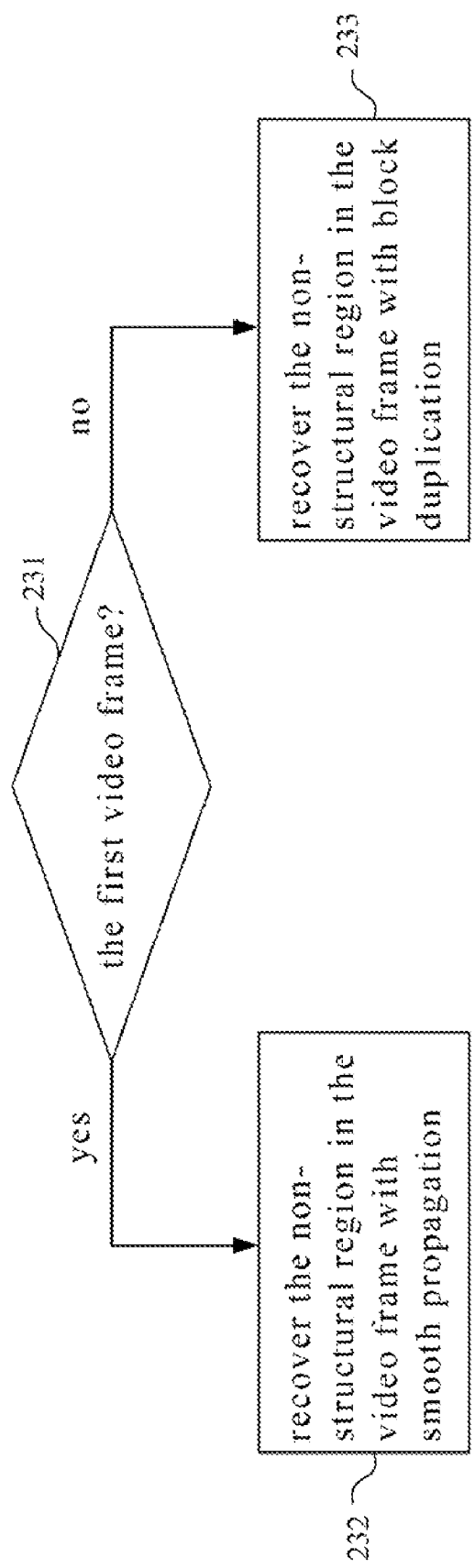
FIG. 6A is a flow chart illustrating detailed steps included in step 230 recovering the non-structural region in the video frame shown in FIG. 1A.

FIG. 6A is a flow chart illustrating detailed steps included in step 230 recovering the non-structural region in the video frame shown in FIG. 1A:

(2.3.1) Determine whether the video frame is a first video frame (step 231).

Figure 6B:
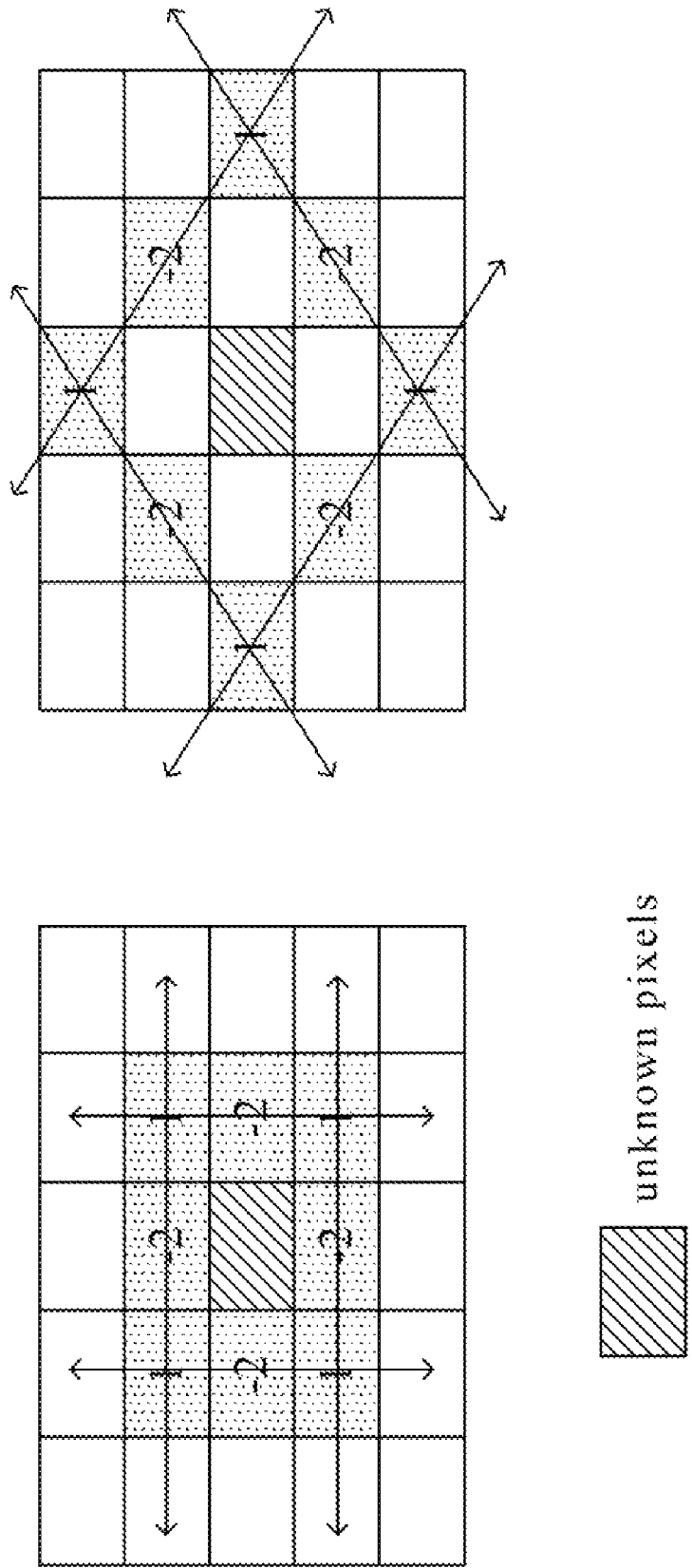
FIG. 6B is a diagram illustrating the octagonal priority-based decision.

(2.3.2) When the video frame is determined as the first video frame, recover the non-structural region in the video frame with smooth propagation (step 232). Here, an octagonal priority-based decision is used to determine a filling pixel value based on eight sides of an unknown pixel. Please refer to 6B. FIG. 6B is a diagram illustrating the octagonal priority-based decision. Each side consists of three pixels. First, a side with the highest priority is determined from the eight sides by using the following formula:

upper side: $\nabla_0^2 f = f(x+1,y-1) - 2f(x,y-1) + f(x-1,y-1)$ lower side: $\nabla_1^2 f = f(x+1,y+1) - 2f(x,y+1) + f(x-1,y+1)$ left side: $\nabla_2^2 f = f(x-1,y+1) - 2f(x-1,y) + f(x-1,y-1)$ right side: $\nabla_3^2 f = f(x+1,y+1) - 2f(x+1,y) + f(x+1,y-1)$ upper right side: $\nabla_4^2 f = f(x+2,y) - 2f(x+1,y-1) + f(x,y-2)$ upper left side: $\nabla_5^2 f = f(x-2,y) - 2f(x-1,y-1) + f(x,y-2)$ lower right side: $\nabla_6^2 f = f(x+2,y) - 2f(x+1,y+1) + f(x,y+2)$ lower left side: $\nabla_7^2 f = f(x-2,y) - 2f(x-1,y+1) + (x,y+2)$ $$Pr(\Psi) = \operatorname*{argmin}_{i=0\ldots 7}(\nabla_i^2 f)$$

$\Delta_{0 \ldots 7}^2 f$ represents the second derivative of one side, f( ) represents the pixel value of one pixel, x and y represent coordinates of neighboring pixels, $Pr(\psi)$ represents the side with the highest priority, and i represents the index value of one side.

(2.3.3) When the video frame is not determined as the first video frame, recover the non-structural region in the video frame with block duplication (step 233). Since few changes are in the non-structural regions of adjacent frames, the recovery of the frames may be done with direct block duplication.

The caption removal method described above is applicable to digital is video editing systems, and digital video editing systems may be incorporated or embedded into video editing products, digital TVs, portable TVs, set-top boxes, video players, and the like.

In conclusion, the aforementioned embodiments of the present invention disclose a caption removal method for a digital video editing system. This invention provides automatic analysis and recovery of film content and can process the caption removal for large and complex areas. This invention may also be used for the removal of irregular movements and objects covering large areas. The temporal and spatial consistency of the film content after the removal may be maintained.

First, the embodiments simply consider the structural features of videos for the spatial domain, so unnecessary computations can be avoided and execution speed can be enhanced. Second, in order to analyze the structure distribution precisely, a rotated block matching algorithm handling irregular structures is presented. This rotated block matching algorithm takes the significant-gradient direction and multi-criterions into consideration. After the structures are completed, take the second derivative of the gradient for the neighboring pixels of an unknown pixel to determine the filling pixel values for the non-structural region (texture region). Then, smooth propagation of neighboring pixels can recover the non-structural region precisely.

It will be apparent to those skilled in the art that various modifications and variations can be made to the structure of the embodiments without departing from the scope or spirit of the invention. In view of the foregoing, it is intended that the embodiments cover modifications and variations of this invention provided they fall within the scope of the following claims and their equivalents.

What is claimed is:

1. A caption removal method for a digital video editing system comprising the following steps:
   inputting a video frame of a video sequence;
   providing a high level executing stage, the high level executing stage comprising the following steps:
      recovering the structural region of the temporal domain in the video frame, further comprising:
         analyzing and describing the distribution of the structural region of the temporal domain to obtain a most similar block using a rotated block matching algorithm;
         obtaining an initial position of an interpolation block using an adaptive interpolation algorithm; and
         adjusting the coordinates of the interpolation block adaptively to obtain a desired recovery block using the rotated block matching algorithm; and recovering the structural region of the spatial domain in the video frame, further comprising:
defining that the structural distribution of the spatial domain has characteristics similar to those of an SP-Line curve;
performing the rotated block matching algorithm to obtain a first similar block and a second similar block with a fractional structural block;
calculating the tangent vector at the center coordinate of the first similar block and the tangent vector at the center coordinate of the second similar block to obtain the SP-Line; and
moving the first similar block to the fractional structural block along the SP-Line to generate the recovery structure; and
providing a low level executing stage, the low level executing stage comprising the following step:
recovering the non-structural region in the video frame, further comprising:
determining whether the video frame is a first video frame;
recovering the non-structural region in the video frame with smooth propagation when the video frame is determined as the first video frame; and
recovering the non-structural region in the video frame with block duplication when the video frame is not determined as the first video frame.

2. The caption removal method of claim 1, wherein the rotated block matching algorithm comprises the following steps:
selecting a primary reference block from a primary reference frame;
calculating a rotation reference pixel for the primary reference block;
selecting from a secondary reference frame a search region corresponding to the primary reference block, wherein the search region corresponding to the primary reference block consists of a plurality of secondary reference blocks; and
comparing the primary reference block with each of the secondary reference blocks to determine the most similar block.

3. The caption removal method of claim 2, wherein the size of the primary reference block is 5×5 pixel units.

4. The caption removal method of claim 2, wherein the size of the search area corresponding to the primary reference frame is 40×40 pixel units.

5. The caption removal method of claim 2, wherein for each of the secondary reference blocks the comparing step comprises the following steps:
calculating a rotation reference pixel for the secondary reference block;
rotating one of the primary reference block and the secondary reference block a rotation angle; and
calculating average mean square errors of all structural pixel values in the primary reference block and the secondary reference block to obtain the similarity level between the primary reference block and the secondary reference block.

6. The caption removal method of claim 5, wherein the rotation reference pixel is obtained by using the following formula:

$$\varphi = \underset{p \in \vartheta}{\arg\max}\left(\sqrt{\begin{array}{l}((p_{0,1} - p_{0,0} + p_{1,1} - p_{1,0})/2)^2 + \\ ((p_{0,0} - p_{1,0} + p_{0,1} - p_{1,1})/2^2\end{array}}\right)$$

wherein $\theta$ represents all of the pixels in the block, $p_{0,0}$ represents the pixel (p) currently being compared, and $p_{0,1}$, $p_{1,1}$, and $p_{1,0}$ represent the upper, upper right, and right pixels respectively of the pixel (p) currently being compared.

7. The caption removal method of claim 5, wherein the rotation angle is the difference between a perpendicular gradient direction of the rotation reference pixel of the primary reference block and a perpendicular gradient direction of the rotation reference pixel of the secondary reference block.

8. The caption removal method of claim 7, wherein the perpendicular gradient direction is obtained by using the following formula:

$$\Theta_V^{195} = \arctan((\phi_{0,1}-\phi_{0,0}+\phi_{1,1}-\phi_{1,0})/(\phi_{0,0}-\phi_{1,0}+\phi_{0,1}-\phi_{1,1}))_\perp$$

wherein $\phi_{0,0}$ represents the rotation reference pixel, and $\phi_{0,1}$, $\phi_{1,1}$, and $\phi_{1,0}$ represent the upper, upper right, and right pixels respectively of the rotation reference pixel.

9. The caption removal method of claim 2, wherein the adaptive interpolation algorithm comprises the following steps:
obtaining structural pixels of the primary frame by interpolating structural pixels of the primary reference block and the secondary reference block; and
performing interpolation calculations with linear movement according to the temporal spatial distance between the secondary reference frame and the primary frame and the temporal spatial distance between the primary frame and the primary reference frame.

10. The caption removal method of claim 2, wherein the step of adjusting the coordinates of the interpolation block adaptively using the rotated block matching algorithm so as to obtain a desired recovery block comprises the following step:
searching all blocks within 40×40 pixel units around the interpolation block sequentially to obtain a displacement value.

11. The caption removal method of claim 1, wherein the SP-Line curve is formed by connecting the first similar block and the second similar block.

12. The caption removal method of claim 1, wherein the tangent vector is obtained by using the following formula:

$$\Delta\tau_x = \partial V/\partial x, \Delta\tau_y = \partial V/\partial y$$

$$\partial V/\partial y = \sin\theta \cdot dR, \partial V/\partial x = \sin\theta \cdot dR/\tan\theta$$

wherein $\Delta\tau_x$ and $\Delta\tau_y$ represent x-axis value and y-axis value of the tangent vector respectively, $\partial V/\partial_y$ and $\partial V/\partial_x$ represent derivatives of the gradient and further represent elements of the tangent vector, $\theta$ represents the gradient angle at the central pixel of a similar block, and R represents radius.

13. The caption removal method of claim 1, wherein the step of recovering the non-structural region in the video frame with smooth propagation comprises the following step:
determining a filling pixel value with an octagonal priority-based decision based on eight sides of an unknown pixel.

14. The caption removal method of claim 13, wherein each of the eight sides consists of three pixel values.

15. The caption removal method of claim 14, wherein the octagonal priority-based decision determines a side with the highest priority from the eight sides by using the following formula:

upper side: $\nabla_0^2 f = f(x+1,y-1) - 2f(x,y-1) + f(x-1,y-1)$ lower side: $\nabla_1^2 f = f(x+1,y+1) - 2f(x,y+1) + f(x-1,y+1)$ left side: $\nabla_2^2 f = f(x-1,y+1) - 2f(x-1,y) + f(x-1,y-1)$ right side: $\nabla_3^2 f = f(x+1,y+1) - 2f(x+1,y) + f(x+1,y-1)$ upper right side: $\nabla_4^2 f = f(x+2,y) - 2f(x+1,y-1) + f(x,y-2)$ upper left side: $\nabla_5^2 f = f(x-2,y) - 2f(x-1,y-1) + f(x,y-2)$ lower right side: $\nabla_6^2 f = f(x+2,y) - 2f(x+1,y+1) + f(x,y+2)$ lower left side: $\nabla_7^2 f = f(x-2,y) - 2f(x-1,y+1) + (x,y+2)$ $$Pr(\Psi) = \underset{i=0\ldots 7}{\mathrm{argmin}}(\nabla_i^2 f)$$

wherein $\nabla_{0\ldots 7}^2 f$ represents the second derivative of one side, f( ) represents the pixel value of one pixel, x and y represent coordinates of neighboring pixels, $Pr(\psi)$ represents the side with the highest priority, and i represents the index value of one side.

16. The caption removal method of claim 15, wherein the filling pixel value is determined by using the pixel values and weights of the side with the highest priority:

$$P_i = \left(\sum_{n \in 1,2,3} P_n \cdot M_n\right) \bigg/ \left(\sum_{n \in 1,2,3} M_n\right)$$

wherein $P_i$ represents the filling pixel value, n represents the index of a pixel on one side, $P_n$ represents the pixel value of a pixel on one neighboring side of the unknown pixel, and $M_n$ represents the weight of a pixel on one neighboring side of the unknown pixel.

17. The caption removal method of claim 16, wherein the weight of a pixel is determined by coefficients of second derivatives.

* * * * *